T. ELY.
Cotton Gin.
No. 4,054.
Patented May 16, 1845.
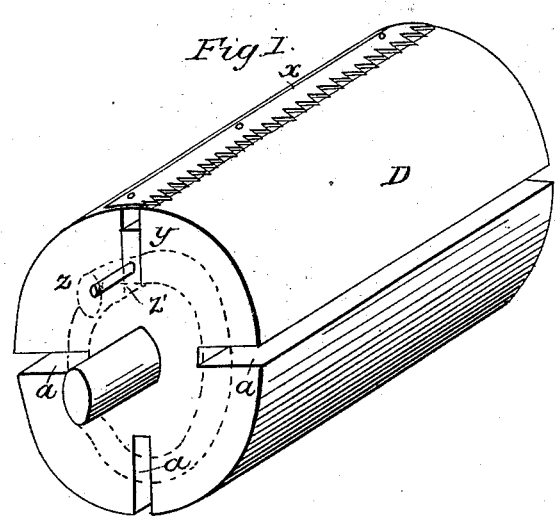

UNITED STATES PATENT OFFICE.

THEODORE ELY, OF NEW YORK, N. Y.

IMPROVEMENT IN MACHINERY FOR BURRING WOOL AND CLEANING COTTON.

Specification forming part of Letters Patent No. 4,054, dated May 16, 1845.

*To all whom it may concern:*

Be it known that I, THEODORE ELY, of the city, county, and State of New York, have invented a new and useful Improvement on a Machine for Burring Wool and Cleaning Cotton, for which I obtained Letters Patent dated 14th September, 1843; and I do hereby declare that the following is a full, clear, and exact description thereof, illustrated by the accompanying drawings, in which—

Figure 1 is an isometrical view. Fig. 2 is the eccentric which moves the bar $y$ in and out, detached. One of these is placed at each end.

The machine is constructed in the ordinary way, except in the main cylinder D. This cylinder has any number of recesses, $a$, in it, in which slide bars $y$ in and out in a radial line within said recesses, being guided in their motion by eccentrics attached to the frame on each side of the cylinder in which the pins Z on the bar work. The roller Z' and the groove of the eccentric are shown in red lines in Fig. 1. The teeth for the said cylinder are formed on a flat plate, $x$, Fig. 1, which is screwed onto the periphery of the cylinder, with the teeth projecting over the recess, the opposite side of which is cut down a little, so that the teeth can catch onto the cotton to be ginned. In the recess there is a square bar, $y$, that slides out and in by the same arrangement of machinery as operated the teeth in the original machine. The face of this bar toward the teeth is covered with buff leather, cloth, or other suitable elastic substance, which, when the bar is forced out, presses against the teeth and firmly holds whatever is between them. Its operation when in the machine is as follows, viz: The cotton is fed into the machine as usual on the machine to which this is an improvement. It is caught by the teeth on the plate $x$ and confined by the pressure of the bar $y$ against said teeth. The cylinder then revolves and the seed are knocked out by the ordinary means, after which the bar $w$ falls back and releases the cotton, which is taken from the cylinder, and the teeth are again ready to seize the cotton from the feed-rollers.

What I claim as my improvement, and desire to secure by Letters Patent, is—

The combination of the movable bar $y$ with the stationary teeth on the main cylinder D, substantially in the manner and for the purpose above described.

THEODORE ELY.

Witnesses:
ANSON D. F. RANDOLPH,
M. C. MORGAN.